United States Patent Office 3,257,356
Patented June 21, 1966

3,257,356
THERMOSETTING COMPOSITIONS AND THERMOSET PRODUCTS PRODUCED FROM A 6-HYDROXYTETRAHYDROPYRAN - 2 - CARBOXYLIC ACID LACTONE
Jay A. Gervasi, St. Albans, W. Va., assignor to Union Carbide Corporation, a corporation of New York
No Drawing. Filed Jan. 18, 1962, Ser. No. 167,162
41 Claims. (Cl. 260—47)

This invention relates to thermosetting compositions and thermoset products produced therefrom. More particularly, this invention relates to thermosetting compositions containing a curing catalyst and a thermosetting polymer which is formed on reacting a 6-hydroxytetrahydropyran-2-carboxylic acid lactone with a polyfunctional organic compound containing at least two reactive hydrogen atoms per molecule.

Thermosetting compositions which are based on thermosetting polymers formed by reacting a 6-hydroxytetrahydropyran-2-carboxylic acid lactone and a polyfunctional organic compound containing at least two reactive hydrogen atoms per molecule have suggested themselves for use in spray coating applications, as being soluble in water, they can be applied as coatings from aqueous solutions thereby eliminating the use of volatile, flammable and possibly toxic organic solvents.

It has been found, however, that such thermosetting compositions have a relatively long curing time. That is, the time required for these compositions to form infusible products, once they have been applied as coatings and heated, is rather lengthy. The relatively long curing time of these compositions, therefore, has limited to an extent their use in spray coating applications. For obvious reasons, it is necessary that compositions used in spray coating applications thermoset to infusible products in a relatively short period of time. In addition to the relatively long curing time which characterizes currently known thermosetting compositions of the type previously described, these compositions, once applied as coatings and cured to infusible products, have a tendency to be swelled by boiling water and by certain organic chemicals such as dioxane, methyl ethyl ketone, dimethylformamide and the like with the result that they sometimes delaminate from the surfaces to which they have been applied.

Another deficiency of thermosetting compositions, based on a polymer of a 6-hydroxytetrahydropyran-2-carboxylic acid lactone and a polyfunctional organic compound, has been the tendency of such compositions to drain excessively from the surface to which they have been applied. This excessive drainage, particularly from inclined or from vertical surfaces, often referred to as crawling or cratering, is readily detected as it is manifested by a thinly coated area surrounded by a thicker coated area.

The present invention provides for thermosetting compositions, based on polymers of a 6-hydroxytetrahydropyran-2-carboxylic acid lactone and a polyfunctional organic compound, that is, a compound having at least two reactive hydrogen atoms per molecule, which thermoset to infusible products in a relatively short period of time thereby being excellently suited for use in spray coating applications. Furthermore, the compositions of this invention, once applied as coatings and cured to infusible products, exhibit excellent adhesion to surfaces to which they have been applied and retain this excellent adhesion even after being in contact with boiling water and organic chemicals. In addition, the compositions of this invention do not suffer from excessive drainage, and, therefore, can be advantageously used as coatings, fillers and the like on inclined surfaces.

The thermosetting compositions of this invention comprise, in admixture, a thermosetting polymer which is formed by reaction of a 6-hydroxytetrahydropyran-2-carboxylic acid lactone with a polyfunctional organic compound containing at least two reactive hydrogen atoms; and a curing catalyst wherein the curing catalyst or mixtures thereof are present in the compositions in an amount of from about 0.05 percent by weight to about 3 percent by weight or higher, and preferably from about 0.1 percent by weight to about 0.3 percent by weight, based on the weight of the thermosetting polymer. Amounts greater than 3 percent by weight can be employed, although no practical advantage is gained thereby.

The 6-hydroxytetrahydropyran-2-carboxylic acid lactones which are reacted with polyfunctional organic compounds containing at least 2 reactive hydrogen atoms per molecule to produce thermosetting polymers suitable for purposes of the present invention have the formula:

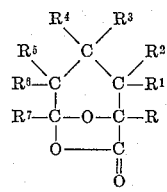

wherein R through R⁷, which can be the same or different, are hydrogen or alkyl and when alkyl generally containing from 1 to 8 carbon atoms inclusive and preferably containing from 1 to 4 carbon atoms inclusive. Illustrative of such alkyl groups are the following: methyl, ethyl, n-propyl, isopropyl, n-butyl, isopentyl, 2-methylpentyl, 2-ethylhexyl and the like. Exemplary of specific compounds falling within the scope of the above formula are:

6-hydroxytetrahydropyran-2-carboxylic acid lactone;
2,5-dimethyl-6-hydroxytetrahydropyran-
   2-carboxylic acid lactone;
3,6-diethyl-6-hydroxyetetrahydropyran-
   2-carboxylic acid lactone;
2-methyl-4-propyl-6-hydroxytetrahydropyran-
   2-carboxylic acid lactone;
2,4,6-trimethyl-6-hydroxytetrahydropyran-
   2-carboxylic acid lactone;
5-(n-butyl)-6-hydroxytetrahydropyran-
   2-carboxylic acid lactone;
4-(n-amyl)-6-hydroxytetrahydropyran-2-
   carboxylic acid lactone;
3,3-dimethyl-5-ethyl-6-hydroxytetrahydropyran-
   2-carboxylic acid lactone,
and the like.

Compounds which are reacted with the 6-hydroxytetrahydropyran-2-carboxylic acid lactones are those polyfunctional organic compounds, having at least two reactive hydrogen atoms per molecule, which are capable of opening the lactone ring. Typical among such compounds are the polyfunctional alcohols, polyfunctional amines, polyfunctional phenols and polyfunctional mercaptans.

Illustrative of suitable alcohols are the linear and branched chain glycols which have the general formula:

$$HO\mathord{-}(C_nH_{2n})\mathord{-}OH$$

wherein $n$ is an integer having a value of 2 to 20 inclusive, preferably 2 to 5 inclusive, exemplary of which are ethylene glycol, 1,2-propylene glycol, 1,3-propylene glycol, 2,2-dimethyl-1,3-propanediol, 2,2-diethyl-1,3-propanediol, 1,4-butylene glycol, 3-methyl-1,5-pentanediol and the like; linear and branched chain alkylene ether glycols which have the general formula:

$$HO\mathord{-}(C_aH_{2a}O)_b\mathord{-}H$$

wherein $a$ is an integer having a value of 2 to 20 inclusive, preferably 2 to 5 inclusive, and $b$ is an integer having a value of 2 to 85 inclusive, such as diethylene glycol, dipropylene glycol, poly(ethylene glycol), poly-(propylene glycol) and the like; other suitable polyfunctional alcohols are the cycloaliphatic diols such as 1,4-cyclohexanediol and the like; higher polyols such as glycerol, trimethylolethane, 1,2,4-butanetriol, pentaerythritol, 1,2,6-hexanetriol, dipentaerythritol sorbitol, glucose, sucrose, starch, cellulose and the like.

Exemplary of suitable polyfunctional amines are the primary and secondary amines, among which can be noted the following compounds: methylamine, ethylamine, n-propylamine, isopropylamine, n-butylamine, n-amylamine, laurylamine, n-hexylamine, allylamine, n-heptylamine, cyclopentylamine, ethylenediamine, diethylaminopropylamine, trimethylenediamine, tetramethylenediamine, pentamethylenediamine, hexamethylenediamine, ethanolamine, diethanolamine, meta-xylylenediamine, aniline, β-phenylethylamine, α,β-(diphenyl)ethylamine, p,p-diaminodiphenylsulfone, methylenedianiline, p,p-diaminodiphenylmethane, o-aminoacetanilide, o-toluidine, m-toluidine, p-toluidine, o-phenylenediamine, m-phenylenediamine, p-phenylenediamine, diethylenetriamine, o-anisidine, p-anisidine, p-phenetidine, o-chloroaniline, m-chloroaniline, p-chloroaniline, p-bromoaniline, 2,4,6-trichloroaniline, 2,4,6-tribromoaniline, benzidine and hydrazine. Also the polyamines, illustrated by the amines having the general formula:

$$R''NHR'''(NHR')_xNH_2$$

wherein R' is a divalent alkylene radical having the formula: $-C_cH_{2c}-$, wherein $c$ is an integer from 2 to 6 and R''' is an alkylene radical as defined for R' or an arylene radical containing from 6 to 8 carbon atoms such as phenylene ($-C_6H_4-$), methylphenylene $$(-C_6H_3-CH_3-)$$

dimethyl phenylene ($-C_6H_2-(CH_3)_2-$), xylylene ($-CH_2-C_6H_4-CH_2-$) and the like, R'' is either hydroxyalkyl or phenyl substituted hydroxylalkyl, $x$ is an integer from zero to three and with the provisos that when R'' represents phenyl substituted hydroxyalkyl then R''' represents an alkylene radical, and that when R''' represents an arylene radical, then R'' represents hydroxyalkyl and $x$ is zero. Specific hydroxylated polyamines included by the above formula are:

N-(2-phenyl-2-hydroxyethyl)diethylenetriamine,
N-(2-phenyl-2-hydroxyethyl)-1,2-diaminopropane,
N-(2-phenyl-2-hydroxyethyl)-dipropylenetriamine,
N-hydroxyethyl-m-xylenediamine,
N-hydroxyethyl-m-phenylenediamine,
N-hydroxypropyl-m-phenylenediamine, and
N-hydroxypropyl-2,5-toluenediamine.

Other suitable amines are those having the general formula:

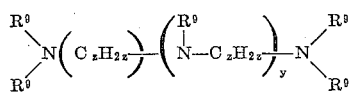

wherein $y$ is an integer having a value of 0 to 3 inclusive, $z$ is an integer having a value of 2 to 6 inclusive, each $R^9$ which can be the same or different, is hydrogen or hydroxyalkyl with the number of instances wherein $R^9$ is hydroxyalkyl being at least one but a whole number which is less than $y+2$. Among such amines can be noted N-hydroxyethylethylenediamine, N-hydroxyethyldiethylenetriamine and the like.

Among suitable phenols are the polyhydric phenols such as catechol, hydroquinone, phloroglucinol, resorcinol, and pyrogallol; the di- or polynuclear phenols such as the bisphenols described in the Bender et al., United States Patent No. 2,506,486 and polyphenylols such as the novolak condensation product of a phenol and a saturated or unsaturated aldehyde containing an average of from 3 to 20 or more phenylol groups per molecule (cf. book by T. S. Carswell entitled, phenoplasts, published in 1947 by Interscience Publishers of New York).

Examples of suitable polyphenylols derived from a phenol and an unsaturated aldehyde such as acrolein, are the triphenylols, pentaphenylols and heptaphenylols described in U.S. Patent No. 2,885,385 and U.S. Patent No. 2,801,989.

The phenols may contain alkyl, alkoxy, or halogen aryl-ring substituents, as exemplified by the alkyl resorcinols, the tribromo resorcinols and the diphenols containing alkyl and halogen substituents on the aromatic ring (Bender et al., U.S. Patent 2,506,486).

Illustrative of suitable dihydric polynuclear phenols are the dihydric polynuclear phenols having the general formula:

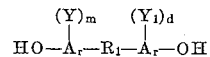

wherein: $A_r$ is an aromatic divalent hydrocarbon radical such as naphthylene and phenylene with phenylene being preferred for purposes of this invention; Y and $Y_1$, which can be the same or different, are alkyl radicals such as methyl, n-propyl, n-butyl, n-hexyl, n-octyl and the like, preferably alkyl radicals having a maximum of 4 carbon atoms; or halogen atoms, i.e., chlorine, bromine, iodine, or fluorine; or alkoxy radicals such as methoxy, methoxymethyl, ethoxy, ethoxyethyl, n-butoxy, amyloxy and the like, preferably an alkoxy radical having a maximum of 4 carbon atoms. It is to be understood that whenever there are substituents exclusive of the hydroxyl groups on either or both of the aromatic divalent hydrocarbon groups, that these substituents can be the same or different; $m$ and $d$ are integers having a value of from 0 to a maximum value corresponding to the number of hydrogen atoms on the aromatic ring ($A_r$) which can be replaced by substituents and can have the same or different values; and $R_1$ is a divalent radical, as, for example,

or $-O-$, or $-S-$, or $-SO-$, or $SO_2-$, or $-S-S-$, or a divalent hydrocarbon radical as, for example, an alkylene radical such as methylene, ethylene, trimethylene, tetramethylene, pentamethylene, hexamethylene, 2-ethyl hexamethylene, octamethylene, nonamethylene, decamethylene, and the like; an alkylidene radical such as ethylidene, propylidene, isopropylidene, isobutylidene, amylidene, isoamylidene, 1-phenyl ethylidene and the like; or a cycloaliphatic radical, such as 1,4-cyclohexylene, 1,3-cyclohexylene, cyclohexylidene, and the like; or halogenated alkylidene, alkylene or cycloaliphatic radicals, alkoxy and aryloxy substituted alkylidene, alkylene or cycloaliphatic radicals, such as methoxy methylene, ethoxy methylene, ethoxy ethylene, 2-ethoxy trimethylene, 3-ethoxy pentamethylene, 1,4-(2-methoxy-cyclohexane), phenoxy ethylene, 2-phenoxy trimethylene, 1,3-(2-phenoxy cyclohexane), and the like; aralkylene radicals, such as phenyl ethylene, 2-phenyl trimethylene, 1-phenyl pentamethylene, 2-phenyl decamethylene, and the like, aromatic radicals, such as phenylene, naphthylene, and the like, halogenated aromatic radicals, such as 1,4-(2-chlorophenylene), 1,4-(2-bromophenylene), 1,4-(2-fluorophenylene), and the like; alkoxy and aryloxy substituted aromatic radicals, such as 1,4-(2-methoxyphenylene), 1,4-(2-ethoxyphenylene), 1,4-(2-n-propoxyphenylene), 1,4-(2-phenoxyphenylene), and the like, alkyl substituted aromatic radicals, such as 1,4-(2-methylphenylene), 1,4-(2-ethylphenylene), 1,4-(2-n-propylphenylene), 1,4-(2-n-butylphenylene), 1,4-(2-n-dodecylphenylene) and the like.

The polyhydric phenols, as stated, can consist of 2 or more phenols connected by such groups as methylene, alkylene, ether, ketone or sulfone. The connecting groups are further exemplified by the following compounds: bis(p-hydroxyphenyl)ether, bis(p-hydroxyphenyl)ketone, bis(p-hydroxyphenyl)methane, bis(p-hydroxyphenyl)dimethyl methane, bis(p-hydroxyphenyl) sulfone and the like.

Among suitable mercaptans for purposes of this invention are those having the formula:

$$R_2SH$$

where $R_2$ is an amino, mercapto or hydroxyl substituted alkyl, aryl, alkaryl or aralkyl radical, generally having a maximum of 20 carbon atoms.

Illustrative of specific mercaptans falling within this formula are: 4-amino-o-thiocresol and its meta and para isomers, 4-amino-1-thionaphthol, 8-amino-2-thionaphthol, o-, m- and p-aminothiophenol, 2-mercapto-benziminazole, 5-amino-2-benzimidazolethiol, ethylene dithioglycol, β-mercaptoethanol, 2-mercaptoethylamine, 5-mercapto-2-naphthol, 2-mercaptopropylamine, 3-mercaptopropylamine, thiocatechol, thioresorcinol, thiohydroquinone, and the like.

It is to be understood that mixtures of 6-hydroxytetrahydropyran-2-carboxylic acid lactones and/or the polyfunctional compounds can be reacted if so desired.

For a detailed description as to the preparation of thermosetting polymers of lactones and polyfunctional organic compounds, reference is made to copending application Serial No. 165,031 filed by J. J. Brezinski, et al. on January 8, 1962 and entitled, "Condensation Polymers," which is incorporated herein by reference, as well as to the examples in this application wherein the preparation of the thermosetting polymers in solution is exemplified. The lactone and the polyfunctional compound react quantitatively with the amount of the resultant polymer produced being equal in weight to the combined weight of the reactants, i.e., the lactone and the polyfunctional compound.

In reacting a 6-hydroxytetrahydropyran-2-carboxylic acid lactone with polyfunctional organic compounds containing at least two reactive hydrogen atoms per molecule, various amounts of the reactants can be employed. Generally, the amount of a 6-hydroxytetrahydropyran-2-carboxylic acid lactone used will vary from about 0.1 mole to about 2 moles, and higher if so desired, per each reactive hydrogen equivalent of the polyfunctional organic compound.

As stated, the thermosetting compositions of this invention comprise, in admixture, a thermosetting polymer formed by reaction of a 6-hydroxytetrahydropyran-2-carboxylic acid lactone with a polyfunctional organic compound containing at least two reactive hydrogen atoms; and a curing catalyst. The curing catalysts which are employed to form the thermosetting compositions of this invention are:

(1) *Friedel-Crafts reagents.*—Friedel-Crafts reagents are compounds, which, according to the electronic theory of acids and bases, accept electrons. Examples of such compounds are the metal halide Friedel-Crafts reagents such as boron trifluoride, boron trichloride, boron tribromide, boron triodide, aluminum chloride, ferric chloride, zinc chloride, stannic chloride and the like. The metal halides can also be employed in the form of complexes such as etherate and amine complexes. Typical metal halide Friedel-Crafts complexes are piperidine-boron trifluoride, ethylamine-boron trifluoride, and diethylether-boron trifluoride. Other suitable Friedel-Crafts reagents are the hydroacid salts such as aluminum hexahydrosulfate, aluminum hexahydrosulfate heptahydrate and the like. For a further explanation of electron acceptor compounds, reference is made to the article by G. N. Lewis, "Valence of Structures of Atoms and Molecules," Chemical Catalogue Company, 1923.

(2) *Non-oxidizing acids having a dissociation constant of greater than* $1 \times 10^{-3}$.—Illustrative of non-oxidizing acids which have a dissociation constant of greater than $1 \times 10^{-3}$ are: hydrofluoric acid, hydrochloric acid, hydrobromic acid, hydroiodic acid, phosphoric acid, phosphorus acid, pyrophosphoric acid, sulfuric acid, sulfurous acid, iodic acid, arsenic acid, periodic acid, selenious acid, bromoacetic acid, chloroacetic acid, dichloroacetic acid, trichloroacetic acid, α-bromopropionic acid, α-chloropropionic acid, tetrafluoropropionic acid, maleic acid, malonic acid, oxalic acid, phthalic acid, picric acid, the alkyl and aryl sulfonic acids such as methyl, ethyl, propyl, butyl and phenyl sulfonic acids, and the like.

(3) *Organo-metallic compounds having the formula:* $Me(OR_3)_4$.—wherein Me is a tetravalent metal of Group IV, or Group VI, or Group VII of the Periodic Table as set forth in Handbook of Chemistry and Physics, 30th Edition, 1947, pages 310–311, e.g., titanium, zirconium, germanium, tin, lead, chromium, selenium, molybdenum, tellurium, tungsten, uranium, and manganese, and wherein each $R_3$, which can be the same or different, is an alkyl radical, generally containing from 1 to 12 carbon atoms inclusive and preferably containing from 1 to 4 carbon atoms inclusive such as methyl, ethyl, n-propyl, n-hexyl, 2-ethylhexyl, dodecyl and the like. Specific organo-metallics coming within the purview of the formula noted above are the tetraethyl ester of ortho titanic acid, tetra-n-butyl ester of ortho titanic acid and the like.

(4) *Organo-metallic compounds having the formula:*

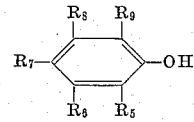

wherein $Me^1$ is a metal of Group IV, or Group VI, or Group VII, or Group VIII of the Periodic Table previously identified, each $R_4$, which can be the same or different, is a monovalent hydrocarbon radical, generally containing from 1 to 30 carbon atoms inclusive, preferably containing from 5 to 12 carbon atoms inclusive such as the saturated monovalent hydrocarbon radicals illustrative of which are n-hexyl, 2-ethylhexyl, n-heptyl, n-octyl, n-dodecyl, eicosyl, cyclohexyl, cycloheptyl and the like, and $g$ is an integer equal in value to the valence of $Me^1$. Exemplary of specific compounds are the cobalt salt of 2-ethylhexanoic acid, the manganese salt of 2-ethylhexanoic acid and the like.

(5) *Alkoxy phenols having the formula:*

wherein $R_5$–$R_9$, which can be the same or different, are hydrogen, alkyl radicals such as methyl, n-propyl, n-butyl, n-hexyl, n-octyl and the like, generally containing 1 to 8 carbon atoms inclusive, and preferably containing 1 to 4 carbon atoms inclusive, or halogen atoms, e.g., chlorine, fluorine, iodine or bromine, or alkoxy radicals such as methoxy, ethoxy, n-butoxy and the like, generally alkoxy radicals containing 1 to 8 carbon atoms inclusive and preferably containing 1 to 4 carbon atoms inclusive, with however, at least one of $R_5$–$R_9$ being alkoxy. Among such compounds can be noted p-methoxyphenol, p-ethoxyphenol, m-chloro-p-methoxyphenol, m-methyl-p-ethoxyphenol and the like.

(6) *An alkali metal salt having the formula:*

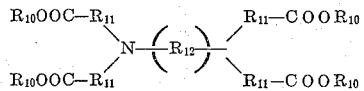

wherein $R_{12}$ is an ethylene radical containing from 2 to 4 carbon atoms inclusive, each $R_{11}$, which can be the same or different, are alkylene radicals containing from 1 to 4 carbon atoms inclusive, and each $R_{10}$, which can be the same or different, are hydrogen or alkali metals provided that at least one of said $R_{10}$ are alkali metals. Suitable ethylene radicals for $R_{12}$ ar ethylene, 1-methylethylene, 1,1-dimethylethylene, 1-ethylethylene and the like; suitable alkylene radicals for each $R_{11}$ are methylene, ethylene, trimethylene and tetramethylene; suitable alkali metals are lithium, sodium, potassium and rubidium.

Among specific compounds can be mentioned the disodium salt of ethylenediamine tetraacetic acid.

The compositions of this invention are formulated by simply admixing the thermosetting polymer and the curing catalyst. The admixing can be accomplished "dry" or in a suitable solvent such as water, diethyl ether, diphenyl ether, dioxane, furan, acetone, methyl ethyl ketone, benzene, toluene, and the like. The preferred solvent is water.

In those instances wherein the thermosetting polymer and the curing catalyst are admixed in a suitable solvent the resultant solution, on being adjusted to the desired solids content generally on the order of about 50 to about 85 percent by weight can be applied directly as a coating.

Thermosetting compositions of this invention can be thermoset to infusible products by heating at elevated temperatures, generally on the order of about 100° C. to about 200° C. for a period of time of about 15 minutes to about 15 hours. The heating cycle in each case will depend upon the exact composition being thermoset. Room temperature curing, requiring a number of days, is not practical.

If desired, various additives can be added to the composition of this invention, prior to their being thermoset to infusible products, to color, to reinforce, to serve as a filming aid, and the like. Illustrative of color lending additives are titanium dioxide and carbon black. Exemplary of filming aids, that is, compounds which promote the deposition of more uniform coatings using the compositions of this invention, are surface active agents of the cationic, anionic, and nonionic type. Where used, these filming aids are employed in amounts of from about 0.05 percent by weight to about 5 percent by weight, and preferably from about 0.3 percent by weight to about 2 percent by weight, based on the weight of the polymer.

The following examples are given to illustrate certain preferred embodiments of the present invention and are not to be construed as limiting the invention in any way.

*Example I*

To 0.30 gram of water, there was added 1.34 grams (0.011 mole) of 6-hydroxytetrahydropyran-2-carboxylic acid lactone together with 0.36 gram (0.0026 mole) of pentaerythritol and the mixture was stirred at a temperature of about 60° C. to about 80° C. until a homogeneous solution was obtained. To this solution, which contained the thermosetting polymer of the lactone and pentaerythritol, there was added 0.004 gram of aluminum hexahydrosulfate heptahydrate and the resulting mixture was stirred to a homogeneous solution. The resultant solution was cast onto a glass plate to a thickness of about 2 mils. The coated plate was placed in a circulating air oven and the film thermoset by heating for 1 hour at 175° C. The thermoset film was hard and free from tack. It was unaffected by water, dioxane, methyl ethyl ketone and dimethylformamide.

A film prepared in an identical manner and from a composition which was the same with the exception that it did not contain aluminum hexahydrosulfate heptahydrate was attacked by dimethylformamide, that is, it was softened by dimethylformamide and exhibited no adhesion when scratched lightly with a spatula.

In this and the following examples, the films were contacted with organic chemicals by applying one drop of the desired chemical to the film and allowing it to remain thereon for 5 minutes. Contacting the films with water was accomplished by total immersion of the coated article into boiling water for 15 minutes.

*Example II*

A composition, in solution, prepared in the same manner as described in Example I was cast onto a glass plate to a thickness of 2 mils. The coated plate was placed in a circulating air oven and the film thermoset by heating at 175° C. for ½ hour. The thermoset film was hard and free from tack. It was unaffected by contact with water, dioxane, methyl ethyl ketone and dimethylformamide.

A thermoset film prepared in an identical manner and from a composition which was the same with the exception that it did not contain aluminum hexahydrosulfate heptahydrate was attacked by dimethylformamide and dioxane.

*Example III*

To 0.15 gram of water there was added 0.67 gram (0.0052 mole) of 6-hydroxytetrahydropyran-2-carboxylic acid lactone and 0.18 gram (0.0013 mole) of pentaerythritol, and the mixture was stirred at a temperature of about 60° C. to about 80° C. until a homogeneous solution was obtained. To this solution there was added 0.002 gram of phosphoric acid (85 percent by weight) and 0.005 gram of a liquid filming aid which was an organo-silicone copolymer produced by the condensation of a polyoxyethylene glycol and an ethoxy end-blocked dimethylsiloxane. This mixture was stirred to a homogeneous solution. The resultant solution was cast onto a bonderized steel panel to a thickness of about 2 mils. The coated panel was placed in a circulating air oven and the film thermoset by heating at 175° C. for 1 hour. The thermoset film was hard and free of tack. It was unaffected by dimethylformamide.

A thermoset film prepared in an identical manner and from a composition which was the same with the exception that it did not contain phosphoric acid was attacked by dimethylformamide.

*Example IV*

To 0.15 gram of water, there was added 0.67 gram (0.0052 mole) of 6-hydroxytetrahydropyran-2-carboxylic acid lactone together with 0.18 gram (0.0013 mole) of pentaerythritol and the mixture was stirred at a temperature of about 60° C. to about 80° C. until a homogeneous solution was obtained. To this solution there was added 0.002 gram of the tetra-n-butyl ester of ortho titanic acid and 0.005 gram of a liquid filming aid composed of ethyl polyoxyethylene amine. This mixture was stirred to a homogeneous solution. The resultant solution was cast onto a bonderized steel panel to a thickness of about 2 mils. The coated panel was placed in a circulating air oven and the film thermoset by heating 175° C. for 1 hour. The thermoset film was hard and free of tack. It was unaffected by dimethylformamide.

A thermoset film, prepared in the same manner from a composition which was the same with the exception that it did not contain n-butyl titinate was attacked by dimethylformamide.

*Example V*

To 0.15 gram of water, there was added 0.67 gram (0.0052 mole) of 6-hydroxytetrahydropyran-2-carboxylic acid lactone together with 0.18 gram (0.0013 mole) of pentaerythritol and the mixture was stirred at a temperature of about 60° C. to about 80° C. until a homogeneous solution was obtained. To this solution there was added 0.002 gram of the manganese salt of 2-ethylhexanoic acid and 0.005 gram of a filming aid (the liquid organo-silicone copolymer previously described). This mixture was stirred to a homogeneous solution. The resultant solution was cast onto a bonderized steel panel to a thickness of about 2 mils. The coated panel was placed in a circulating air oven and the film thermoset by heating at 175° C. for 1 hour. The thermoset film was even, uniform, hard and free of tack. It was unaffected by boiling water.

*Example VI*

A composition, in solution, prepared in a manner described in Example V with the exception that the filming aid used was liquid ethyl polyoxyethylene amine, was cast onto a bonderized steel panel to a thickness of 2 mils. The film was thermoset according to the precedure described in Example V. The thermoset film was unaffected by boiling water.

A thermoset film, prepared in an identical manner from a composition which was the same as described above with the exception that it did not contain the manganese salt of 2-ethylhexanoic acid, was uneven and was attacked by boiling water.

*Example VII*

A composition, in solution, prepared in a manner described in Example VI with the exception that the cobalt salt of 2-ethylhexanoic acid was used in lieu of the manganese salt, was cast onto a bonderized steel panel to a thickness of 2 mils. The film was thermoset according to the procedure described in Example V. The thermoset film was unaffected by boiling water.

A thermoset film, prepared in an identical manner and from a composition which was the same as described above, with the exception that the composition did not contain the cobalt salt, was attacked by boiling water.

*Example VIII*

A thermoset film was prepared in a manner and from a composition as described in Example VII with the exception that the heating cycle by which the film was thermoset was conducted for 15 minutes at 175° C. The thermoset film was hard, free from tack and unaffected by boiling water.

*Example IX*

To 0.15 gram of water, there was added 0.67 gram (0.0052 mole) of 6-hydroxytetrahydropyran-2-carboxylic acid lactone and 0.18 gram (0.0013 mole) of pentaerythritol and the mixture stirred at a temperature of about 60° C. to about 80° C. until a homogeneous solution was obtained. To this solution there was then added 0.002 gram of the cobalt salt of 2-ethylhexanoic acid, and 0.005 gram of a liquid filming aid composed of ethyl polyoxyethylene amine. The mixture was then stirred to a homogeneous solution. The resultant solution was cast onto a bonderized steel panel to a thickness of about 2 mils. The coated panel was placed in a circulating air oven and the film thermoset by heating at 150° C. for 1 hour. The thermoset film was uniform, hard, and free of tack. It was unaffected by boiling water.

A thermoset film, prepared in an identical manner from a composition which was the same as described above, except that thermosetting was achieved by heating at 175° C. for 1 hour and with the exception that it did not contain the cobalt salt, was attacked by boiling water.

*Example X*

A thermoset film was prepared in a manner and from a composition as described in Example IX with the exception that the heating cycle by which the film was thermoset was conducted for 15 minutes at 200° C. The thermoset film was hard, free of tack and unaffected by boiling water.

*Example XI*

To 0.30 gram of water there was added 1.34 grams (0.011 mole) of 6-hydroxytetrahydropyran-2-carboxylic acid lactone together with 0.36 gram (0.0026 mole) of pentaerythritol and the mixture was stirred at a temperature of about 60° C. to about 80° C. until a homogeneous solution was obtained. To this solution was added 0.004 gram of p-methoxyphenol and 0.01 gram of a liquid filming aid composed of ethyl polyoxyethylene amine. The mixture was stirred to a homogeneous solution. The resultant solution was cast on a bonderized steel panel to a thickness of about 2 mils. The coated panel was placed in a circulating air oven and the film thermoset by heating at 175° C. for 1 hour. The thermoset film was even, uniform, hard and free from tack. It was unaffected by boiling water.

A thermoset film, prepared in an identical manner and from a composition which was the same as described above, with the exception that the composition did not contain p-methoxyphenol, was attacked by boiling water.

*Example XII*

To 0.30 gram of water there was added 1.34 gram (0.008 mole) of 2,5-dimethyl-6-hydroxytetrahydropyran-2-carboxylic acid lactone and 0.27 gram (0.002 mole) of pentaerythritol and the mixture was stirred at a temperature of about 60° C. to about 80° C. until a homogeneous solution was obtained. To this solution there was added 0.004 gram of the disodium salt of ethylenediamine tetraacetic acid and 0.01 gram of a liquid filming aid composed of ethyl polyoxyethylene amine. The mixture was stirred to a homogeneous solution. The resultant solution was cast on a bonderized steel panel to a thickness of about 2 mils. The coated panel was placed in a circulating air oven and thermoset by heating at 175° C. for 1 hour. The thermoset film was even, uniform, hard and free from tack. It was unaffected by contact with boiling water.

A thermoset film, prepared in an identical manner and from a composition which was the same, as described above, with the exception that the composition did not contain ethylenediamine tetraacetic acid salt, was attacked by boiling water.

*Example XIII*

To 0.30 gram of water there was added 1.54 grams (0.012 mole) of 6-hydroxytetrahydropyran-2-carboxylic acid lactone and 0.625 gram (0.006 mole) of 1.5-pentanediol and the mixture was stirred at a temperature of about 60° C. to about 80° C. until a homogeneous solution was obtained. To this solution there was added 0.004 gram of hydrochloric acid and this mixture was stirred to a homogeneous solution. The resultant solution was cast on a bonderized steel panel, to a thickness of about 8 mils. The coated panel was placed in a circulating air oven and thermoset by heating at 175° C. for 1 hour. The thermoset film was clear, glossy and uniform.

*Example XIV*

To 0.30 gram of water there was added 1.28 grams (0.01 mole) of 6-hydroxytetrahydropyran-2-carboxylic acid lactone and 0.23 gram (0.0025 mole) of glycerol and the mixture was stirred at a temperature of about 60° C. to about 80° C. until a homogeneous solution was obtained. To this solution there was added 0.002 gram of aluminum chloride and the mixture was stirred to a homogeneous solution. A portion of the resultant solution was cast onto a glass plate to a thickness of about 2 mils. The coated plate was then placed in a circulating air oven and heated for 1 hour at 175° C. The thermoset product was hard, glossy and free from tack.

*Example XV*

To 0.30 gram of water there was added 1.28 grams (0.01 mole) of 6-hydroxytetrahydropyran-2-carboxylic acid lactone and 0.73 gram (0.0067 mole) of p-aminophenol and the mixture was stirred at a temperature of about 60° C. to about 80° C. until a homogeneous solution was obtained. To this solution there was added 0.004 gram of the tin salt of 2-ethylhexanoic acid and the resulting mixture was stirred to a homogeneous solution. A portion of the resultant solution was cast onto a bonderized steel panel to a thickness of about 2 mils. The coated panel was placed in a circulating air oven and heated at 150° C. for 2 hours. The thermoset product was hard, glossy and free from tack.

*Example XVI*

To 0.30 gram of water there was added 1.28 grams (0.01 mole) of 6-hydroxytetrahydropyran-2-carboxylic acid lactone and 0.84 gram (0.0067 mole) of o-aminomercaptobenzene and the mixture was stirred at a temperature of about 60° C. to about 80° C. until a homogeneous solution was obtained. To this solution there was added 0.002 gram of the cobalt salt of cyclohexane carboxylic acid and the mixture was stirred to a homogeneous solution. A portion of the resultant solution was cast onto a bonderized steel panel to a thickness of about 2 mils. The coated panel was placed in a circulating air oven and heated at 150° C. for 2 hours. The thermoset product was hard, glossy and free from tack.

All literature references and patents noted in this application are incorporated herein by reference.

What is claimed is:

1. A thermosetting composition comprising a thermosetting polymer which is the reaction product of a lactone having the formula:

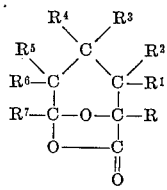

wherein R through $R^7$ are members selected from the group consisting of hydrogen and alkyl containing from 1 to 8 carbon atoms inclusive and a polyfunctional organic compound containing at least two reactive hydrogen atoms per molecule and selected from the group consisting of alcohols, amines, phenols and mercaptans; and a curing catalyst selected from the group consisting of:

(1) Non-oxidizing acids having a dissociation constant of greater than $1 \times 10^{-3}$ (2) Organo-metallic compounds having the formula:

wherein Me is a tetravalent metal from one of Groups IV, VI, and VII of the Periodic Table, and each $R_3$ is an alkyl radical containing from 1 to 12 carbon atoms inclusive;

(3) Organo-metallic compounds having the formula:

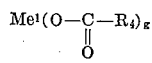

wherein $Me^1$ is a metal from one of Groups IV, VI, VII, and VIII, each $R_4$ is a monovalent hydrocarbon radical containing from 1 to 30 carbon atoms inclusive and $g$ is an integer equal in value to the valence of $Me^1$;

(4) Alkoxy phenols having the formula:

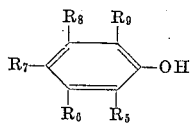

wherein $R_5$–$R_9$ are selected from the group consisting of halogen, alkyl containing from 1 to 8 carbon atoms inclusive, and alkoxy containing from 1 to 8 carbon atoms inclusive, and with the further limitation that at least one of said $R_5$–$R_9$ is alkoxy;

(5) An alkali metal salt having the formula:

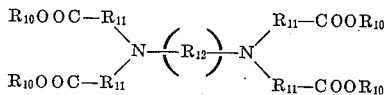

wherein $R_{12}$ is an ethylene radical containing from 2 to 4 carbon atoms inclusive, each $R_{11}$ is an alkylene radical containing from 1 to 4 carbon atoms inclusive, and each $R_{10}$ is selected from the group consisting of hydrogen and alkali metals, with the further limitation that at least 1 of said $R_{10}$ is an alkali metal, said curing catalyst being present in said composition in an amount of at least about 0.05 percent by weight, based on the weight of said polymer.

2. The thermoset product of the composition defined in claim 1.

3. A thermosetting composition as defined in claim 1 wherein the curing catalyst is present in an amount of from about 0.05 percent to about 3 percent by weight, based on the weight of said polymer.

4. The thermoset product of the composition defined in claim 3.

5. A thermosetting composition as defined in claim 1 wherein said curing catalyst is a non-oxidizing acid having a dissociation constant of greater than $1 \times 10^{-3}$.

6. The thermoset product of the composition defined in claim 5.

7. A composition as defined in claim 1 wherein said curing catalyst is an organo-metallic compound having the formula

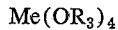

wherein Me is a tetravalent metal from one of Groups IV, VI, and VII of the Periodic Table and each $R_3$ is an alkyl radical containing from 1 to 12 carbon atoms inclusive.

8. The thermoset product of the composition defined in claim 7.

9. A thermosetting composition as defined in claim 7 wherein said alkyl radical contains from 1 to 4 carbon atoms inclusive.

10. A thermosetting composition as defined in claim 1 wherein said curing catalyst is an organo-metallic compound having the formula

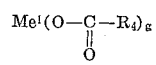

wherein $Me^1$ is a metal from one of Groups IV, VI, VII, and VIII of the Periodic Table, each $R_4$ is a monovalent hydrocarbon radical containing from 1 to 30 carbon atoms inclusive and $g$ is an integer equal in value to the valence of $Me^1$.

11. The thermoset product of the composition defined in claim 10.

12. A thermosetting composition as defined in claim 10 wherein each of said $R_4$ contains from 5 to 12 carbon atoms inclusive.

13. A thermosetting composition as defined in claim 1 wherein said curing catalyst is an alkoxy phenol having the formula

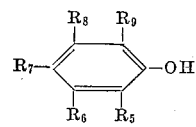

wherein $R_5$–$R_9$ are selected from the group consisting of hydrogen, a halogen, an alkyl containing from 1 to 8 carbon atoms inclusive, and an alkoxy containing from 1 to 8 carbon atoms inclusive, with the further limitation that at least one of said $R_5$–$R_9$ is alkoxy.

14. The thermoset product of the composition defined in claim 13.

15. A thermosetting composition as defined in claim 1 wherein said curing catalyst is an alkali metal salt having the formula

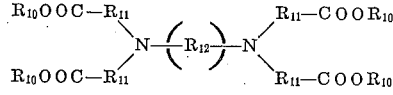

wherein $R_{12}$ is an ethylene radical containing from 2 to 4 carbon atoms inclusive, each $R_{11}$ is an alkylene radical containing from 1 to 4 carbon atoms inclusive, each $R_{10}$ is selected from the group consisting of hydrogen and alkali metals, with the further limitation that at least one of said $R_{10}$ is an alkali metal.

16. The thermoset product of the composition defined in claim 15.

17. A thermosetting composition as defined in claim 15 wherein $R_{12}$ is ethylene.

18. A thermosetting composition as defined in claim 1 wherein the said curing catalyst is phosphoric acid.

19. A thermosetting composition as defined in claim 1 wherein the said curing catalyst is the tetra-n-butyl ester of ortho titanic acid.

20. A thermosetting composition as defined in claim 1 wherein the said curing catalyst is the manganese salt of 2-ethylhexanoic acid.

21. A thermosetting composition as defined in claim 1 wherein the said curing catalyst is the cobalt salt of 2-ethylhexanoic acid.

22. A thermosetting composition as defined in claim 1 wherein the said curing catalyst is p-methoxyphenol.

23. A thermosetting composition as defined in claim 1 wherein said curing catalyst is the disodium salt of ethylenediamine tetraacetic acid.

24. A thermosetting composition as defined in claim 1 wherein said curing catalyst is hydrochloric acid.

25. A thermosetting composition as defined in claim 1 wherein said curing catalyst is the cobalt salt of cyclohexane carboxylic acid.

26. A thermosetting composition as defined in claim 1 wherein the said polyfunctional organic compound is an alcohol.

27. A thermosetting composition as defined in claim 1 wherein the said polyfunctional organic compound is an amine.

28. A thermosetting composition as defined in claim 1 wherein the said polyfunctional organic compound is a phenol.

29. A thermosetting composition as defined in claim 1 wherein the said polyfunctional organic compound is a mercaptan.

30. A thermosetting composition comprising a thermosetting polymer which is the reaction product of 6-hydroxy-tetrahydropyran-2-carboxylic acid lactone with a polyfunctional organic compound containing at least two reactive hydrogen atoms per molecule and selected from the group consisting of alcohols, amines, phenols and mercaptans; and a curing catalyst selected from the group consisting of:

(1) Non-oxidizing acids having a dissociation constant of greater than $1 \times 10^{-3}$;

(2) Organo-metallic compounds having the formula:

$$Me(OR_3)_4$$

wherein Me is a tetravalent metal from one of Groups IV, VI, and VII of the Periodic Table, and each $R_3$ is an alkyl radical containing from 1 to 12 carbon atoms inclusive;

(3) Organo-metallic compounds having the formula

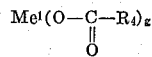

wherein $Me^1$ is a metal from one of Groups IV, VI, VII, and VIII, each $R_4$ is a monovalent hydrocarbon radical containing from 1 to 30 carbon atoms inclusive, and $g$ is an integer equal in value to the valence of $Me^1$;

(4) Alkoxy phenols having the formula:

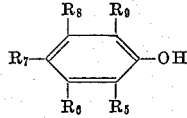

wherein $R_5$–$R_9$ are selected from the group consisting of halogen, alkyl containing from 1 to 8 carbon atoms, and alkoxy containing from 1 to 8 carbon atoms and with the further limitation that at least one of said $R_5$–$R_9$ is alkoxy;

(5) An alkali metal salt having the formula:

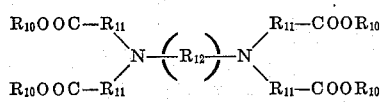

wherein $R_{12}$ is an ethylene radical containing from 2 to 4 carbon atoms, each $R_{11}$ is an alkylene radical containing from 1 to 4 carbon atoms, and each $R_{10}$ is selected from the group consisting of hydrogen and alkali metals, with the further limitation that at least 1 of said $R_{10}$ are alkali metals, said curing catalyst being present in said composition in an amount of at least about 0.05 percent by weight, based on the weight of said polymer.

31. A thermosetting composition as defined in claim 30 wherein the said curing catalyst is aluminum hexahydrosulfate heptahydrate and the polyfunctional organic compound is pentaerythritol.

32. A thermosetting composition as defined in claim 30 wherein the said curing catalyst is phosphoric acid and the polyfunctional organic compound is pentaerythritol.

33. A thermosetting composition as defined in claim 30 wherein the said curing catalyst is the tetra-n-butyl ester of ortho titanic acid and the said polyfunctional organic compound is pentaerythritol.

34. A thermosetting composition as defined in claim 30 wherein the said curing catalyst is the manganese salt of 2-ethylhexanoic acid and the said polyfunctional organic compound is pentaerythritol.

35. A thermosetting composition as defined in claim 30 wherein the said curing catalyst is the cobalt salt of 2-ethylhexanoic acid and the polyfunctional organic compound is pentaerythritol.

36. A thermosetting composition as defined in claim 30 wherein the said curing catalyst is p-methoxyphenol and the said polyfunctional organic compound is pentaerythritol.

37. A thermosetting composition as defined in claim 30 wherein the said curing catalyst is hydrochloric acid and the said polyfunctional organic compound is 1,5-pentanediol.

38. A thermosetting composition as defined in claim 30 wherein the said curing catalyst is aluminum chloride and the said polyfunctional organic compound is glycerol.

39. A thermosetting composition as defined in claim 30 wherein the said curing catalyst is the tin salt of 2-ethylhexanoic acid and the said polyfunctional organic compound is p-aminophenol.

40. A thermosetting composition as defined in claim 30 wherein the said curing catalyst is the cobalt salt of cyclohexane carboxylic acid and the said polyfunctional organic compound is o-aminomercaptobenzene.

41. A thermosetting composition comprising a thermosetting polymer which is the reaction product of 2,5-dimethyl-6-hydroxytetrahydropyran-2-carboxylic acid lactone and pentaerythritol in admixture with from about 0.1 to 0.3 percent by weight, based on the weight of said polymer of the disodium salt of ethylenediamine tetraacetic acid.

References Cited by the Examiner

UNITED STATES PATENTS 2,455,731 12/1948 Caldwell _____ 260—78.3
3,052,692 9/1962 Phillips _____ 260—78.3
3,169,945 2/1965 Hostettler _____ 260—78.3

OTHER REFERENCES

Brezinski et al., J. Organic Chemistry, vol. 24, pages 1807–1809, November 1959.

WILLIAM H. SHORT, *Primary Examiner.*

JOSEPH R. LIBERMAN, *Examiner.*

J. C. MARTIN, *Assistant Examiner.*